(12) United States Patent
Perkins et al.

(10) Patent No.: US 7,343,163 B1
(45) Date of Patent: Mar. 11, 2008

(54) ADAPTIVE CHANNEL ACCESS SCHEME

(75) Inventors: Matthew R. Perkins, Sunrise, FL (US);
Vernon A. Allen, Sunrise, FL (US);
Robert J. O'Dea, Fort Lauderdale, FL (US); Juan C. Palacios, Plantation, FL (US); Priscilla L. Chen, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 700 days.

(21) Appl. No.: 09/596,442

(22) Filed: Jun. 19, 2000

(51) Int. Cl.
*H04Q 7/20* (2006.01)
(52) U.S. Cl. ............... 455/452.1; 455/519; 455/62; 455/450; 455/423; 370/329
(58) Field of Classification Search ............ 455/518, 455/519, 62, 63, 451, 452, 63.1, 452.1, 450, 455/423; 370/329
See application file for complete search history.

(56) References Cited

U.S. PATENT DOCUMENTS

| | | | |
|---|---|---|---|
| 4,870,408 A | 9/1989 | Zdunek et al. | |
| 5,081,671 A * | 1/1992 | Raith et al. | 455/452.1 |
| 5,230,078 A * | 7/1993 | Varela et al. | 340/3.71 |
| 5,235,631 A | 8/1993 | Grube et al. | 379/58 |
| 5,299,199 A | 3/1994 | Wilson et al. | 370/95.3 |
| 5,369,783 A | 11/1994 | Childress et al. | |
| 5,606,727 A * | 2/1997 | Ueda | 455/513 |
| 5,625,886 A * | 4/1997 | Raes | 455/519 |
| 5,666,655 A * | 9/1997 | Ishikawa et al. | 455/512 |
| 6,052,578 A * | 4/2000 | McWeeny et al. | 455/414 |
| 6,360,076 B1 * | 3/2002 | Segura et al. | 370/230 |
| 6,385,461 B1 * | 5/2002 | Raith | 455/466 |
| 6,389,284 B1 * | 5/2002 | Cook et al. | 455/3.05 |
| 6,438,375 B1 * | 8/2002 | Muller | 455/435.3 |
| 6,449,477 B1 * | 9/2002 | Weissman | 455/422 |
| 6,449,484 B1 * | 9/2002 | Grubeck et al. | 455/450 |
| 6,697,345 B1 * | 2/2004 | Corrigan et al. | 370/330 |

FOREIGN PATENT DOCUMENTS

| | | |
|---|---|---|
| EP | 1090515 B1 | 8/2002 |
| GB | 2319436 | 5/1998 |

* cited by examiner

*Primary Examiner*—Nghi H. Ly
(74) *Attorney, Agent, or Firm*—Barbara R. Doutre

(57) ABSTRACT

An adaptive channel access scheme allows for statistics that are collected to be used to group radio users into subgroups according to the desired statistic. The subgroups then utilize channels, separated by time or frequency, to access the communication system (100). The sub-grouping of the radio users is designed to help minimize the chances of channel-access collisions from occurring.

16 Claims, 3 Drawing Sheets

| USER | t=0 | t=1 | t=2 | t=3 | t=4 |
|---|---|---|---|---|---|
| 1 | 0 / 0 | 0.1 / 0.1 | 0.1 / 0.1 | 0.1 / 0.1 | 0 / 0.08 |
| 2 | 0 / 0 | 0 / 0 | 0.1 / 0.05 | 0.2 / 0.1 | 0 / 0.08 |
| 3 | 0 / 0 | 0.9 / 0.9 | 0 / 0.45 | 0 / 0.3 | 0 / 0.23 |
| 4 | 0 / 0 | 0 / 0 | 0 / 0 | 0 / 0 | 0 / 0 |
| 5 | 0 / 0 | 0.5 / 0.5 | 0.5 / 0.5 | 0.5 / 0.5 | 0.5 / 0.5 |
| 6 | 0 / 0 | 0 / 0 | 1.0 / 0.5 | 0.2 / 0.4 | 1.2 / 0.6 |
| 7 | 0 / 0 | 0 / 0 | 0 / 0 | 0 / 0 | 0 / 0.08 |
| 8 | 0 / 0 | 0.1 / 0.1 | 0.7 / 0.4 | 1.0 / 0.9 | 0 / 0.45 |
| 9 | 0 / 0 | 0 / 0 | 0 / 0 | 0 / 0 | 0 / 0.08 |

|     | | | | | |
|---|---|---|---|---|---|
| 502 ▨ | 0 | 0.9 | 0.6 | 0.7 | 0.68 |
| 504 ▨ | 0 | 0.5 | 0.5 | 0.7 | 0.58 |
| 506 □ | 0 | 0.2 | 0.9 | 0.9 | 0.68 |

*FIG. 5*

|     | | | | | |
|---|---|---|---|---|---|
| 602 ▨ | 1,2,3 | 2,3,7 | 1,2,3 | 3,4,6 | 2,6,7 |
| 604 ▨ | 4,5,6 | 4,5,6 | 4,5,7 | 1,2,5 | 1,4,5 |
| 606 □ | 7,8,9 | 1,8,9 | 6,8,9 | 7,8,9 | 3,8,9 |

*FIG. 6*

ADAPTIVE CHANNEL ACCESS SCHEME

TECHNICAL FIELD

This invention relates in general to radio communication systems, and more particularly, to a method for providing an adaptive channel access scheme in a radio communication system.

BACKGROUND

In shared-channel environments that incorporate channel-access devices, two or more devices may transmit data simultaneously, causing collisions. Most communication protocols use a form of random back-off protocol to resolve these collisions, which ultimately results in a communication delay. This invention seeks to minimize the number of collisions that occur during simultaneous channel access requests, and improve throughput and delay for any given channel that may experience contention.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 5 shows a subgroup cumulative score table in accordance with the invention.

FIG. 6 illustrates the subgroup location of the different radio users in different intervals of time in accordance with the invention.

DETAILED DESCRIPTION OF THE PREFERRED EMBODIMENT

Figure 1:
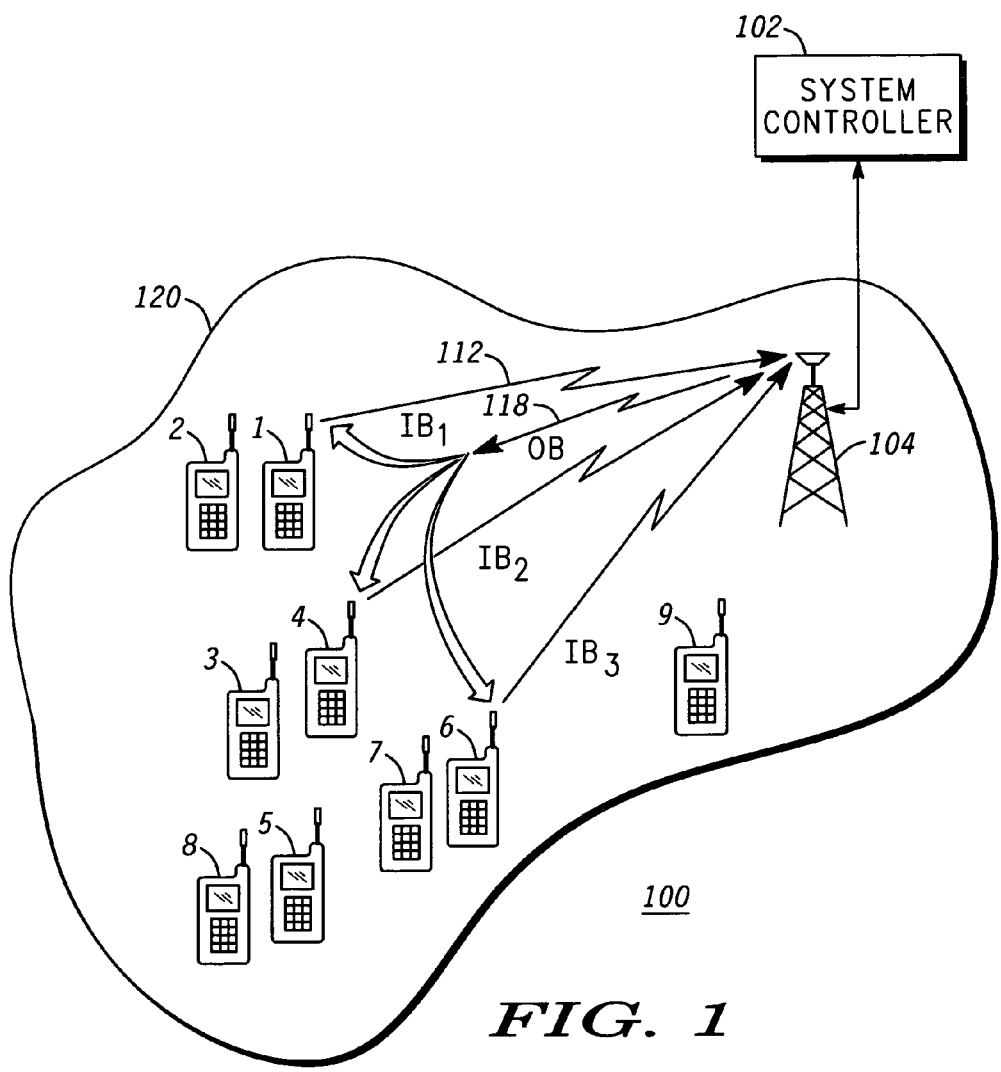
FIG. 1 illustrates a simplified communication system diagram in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention utilizes communication statistics to minimize collision occurrence during channel access. This requires that connection statistics be tabulated and recorded, either by each device (radios) or a master device (central radio communication resource), for the purpose of reducing simultaneous channel access. The results of these tabulations are used to group radio users into subgroups according to the desired communication statistic. The radios within a subgroup then share a communication channel, separated by time or frequency from the communication channels allocated to other subgroups, to access the communication system in an organized fashion such that channel-access collisions are minimized. The recorded connection statistics could be based on, but are not limited to, average channel usage, number of channel accesses per unit time, device priority, average on time of the devices, peak usage periods, or averaged receive signal strength.

Referring now to FIG. 1, there is shown a simplified diagram of a wireless communication system such as a trunked radio system that can be used with the present invention's adaptive channel access scheme. The communication system includes a system or dispatch controller 102, at least one base site 104, and a plurality of communication units 1-9. Base site 104 provides communication service to a corresponding service coverage area 120. The base site 104 could as one specific example comprise an "iDEN" Enhanced Base Transceiver Site and the system controller 102 could comprise an 'iDEN' Dispatch Application Processor both manufactured by Motorola Inc. The present invention can be implemented using many different types of communication systems. In the preferred embodiment, the base site 104 preferably supports one or more trunking communication platforms (modes), such as FDMA (frequency division multiple access), TDMA (time division multiple access), CDMA (code division multiple access), etc. In the preferred embodiment, the communication system comprises a synchronized radio communication system such as a TDMA mode system.

In a typical trunked system, requests for a resource such as a channel (or time slot in TDMA, etc.) are made by the communication devices or radios 1-9 to the system controller 102 via a control channel or by sending control signals over one or more of the working channels. The system controller 102 then assigns available communication resources from the system (a channel, time slots, etc.) to the requesting radio.

When a particular radio, such as radio 1 wants to initiate a call with one or more other radios, the user of radio 1 presses and holds his push-to-talk (PTT) switch. The system controller 102 then allocates an inbound resource such as channel ($IB_1$) 112 to radio 1. System controller 102 also allocates an outbound resource, channel (OB) 118, for transmitting audio or other information to all radios affiliated with the call.

Figure 2:
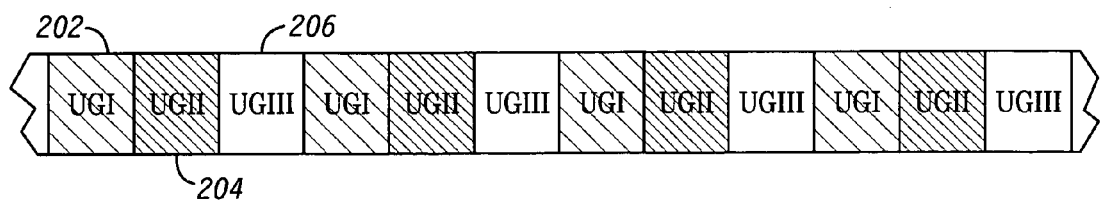
FIG. 2 shows subgroup time slots embedded in a control string in accordance with the present invention.

To illustrate how the contention algorithm of the present invention works, an example of a channel access in a Public Mobile Radio (PMR) system, such as system 100, in which there are nine users attempting to gain access to the control channel will be discussed. In this example, the control channel or control string has been divided in time to accommodate three groups of users as shown in FIG. 2. The three slots include User Group I (UGI) 202, User Group II (UGII) 204 and User Group III (UGIII) 206.

In this example, a particular statistic, average channel usage, translates to a user's average talk-time and is used as the table metric for the preferred embodiment, although other statistics can be used. Upon system initiation, the nine radios are divided into three subgroups that each contains three radios. The initial grouping can either be random or predetermined depending on the particular system design. These initial groupings can and will be modified over time depending on the statistics gathered over time. These initial subgroups are UGI 202, UGII 204 and UGIII 206 and comprise radios: radios 1-3, radios 4-6, and radios 7-9, respectively. As explained earlier, these radios are only permitted to access the control channel during their respective subgroup timeslot (UGI, UGII or UGIII) and they may not use a timeslot that is dedicated for another subgroup.

After the system is initialized, the contention algorithm periodically tabulates the average talktime or other statistic in use for each user and for each subgroup, and determines whether the subgroups should be reorganized based on the results. As mentioned before, this tabulation can be performed by a central resource, such as system controller 102 or by each of the individual radios 1-9 in the system. System controller 102 and/or radios 1-9 can perform the tabulation by monitoring the system activity in order to collect the particular statistic that is key to the channel access scheme.

Figures 3, 4:
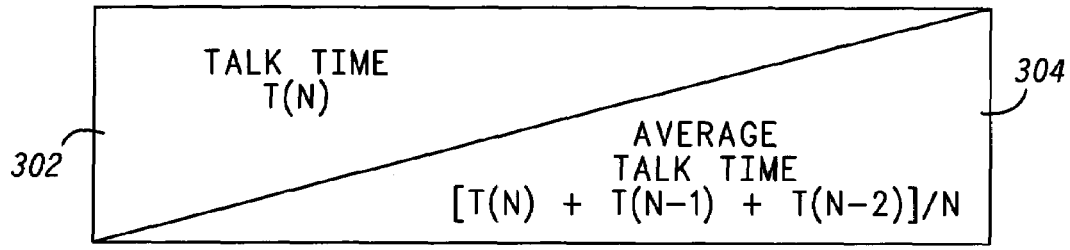
FIG. 3 illustrates the talk time and average talk time information that is stored in the table shown in FIG. 4 in accordance with the invention.
FIG. 4 shows a scenario and possible contention algorithm table in accordance with the invention.

FIG. 4 illustrates an example of tabulated talk-time statistics for a group of radio users. Radios 1-9 are represented by the table rows 408 and the table columns represent the results of the algorithm calculations at different periods of time.

As shown in FIG. 3, the upper triangle 302 of each table entry in FIG. 4 contains a number that represents each user's instantaneous talk-time score (higher talk-time scores correspond to longer talk times) which is used to calculate each users average talk-time score shown in the lower triangle 304 of each table entry in FIG. 4. The three highest average talk-time scores of each algorithm tabulation are printed in bold face for each of the time periods. Equal talk time scores can result in more than three users having the three highest average talk time scores, as illustrated in time period 1.

The users that have the highest talk-time scores at a given tabulation interval are separated by subgroups to reduce the likelihood of a subgroup timeslot collision. If, after separation, one subgroup has a cumulative talk-time score that is much higher than that of another subgroup, lower talk-time scoring users may be assigned to different subgroups in order to minimize the cumulative talk-time of every subgroup. This, in turn, gives every user the best probability of accessing a control channel time slot without contention.

In the particular example shown in FIG. 4, call initiation is established at t=0. As previously stated, the nine radio users are immediately subdivided into three subgroups as shown in FIG. 4 into UGI 402, UGII 404 and UGIII 406 (shown using different crosshatch patterns). At time t=1, radio users 1, 3, 5 and 8 accumulate talk-time statistics. Since radio users 1 and 3 are in the same talkgroup and accumulated two of the highest talk time scores, the contention algorithm will attempt to separate them. In this case, user 1 is moved out of UGI 402 to UGIII 406 and radio 7 is moved to the open spot in UGI 402. At time t=2, more radio users accumulate talk-time statistics which results in more subgroup reallocation as noted. During this time interval, users 6 and 7 switch groups. The above reallocation procedure will continue as long as the system is active. However, in other system designs the reallocation and statistic gathering can be performed only during predetermined periods of time (e.g., peak system usage times, etc.). The reallocation and statistics gathered can also be reset during periodically either at predetermined times, or by a central system device, such as system controller 102.

In FIG. 5, there are shown cumulative talktime scores for each of the time intervals for UGI 502, UGII 504 and UGIII 506. In this example, it can be seen that the cumulative talk time scores are more nearly equal at t=9 than they would have been if the groups were not reorganized. In FIG. 6, there is shown the radio user grouping into UGI 602, UGII 604 and GUIII 606 over each of the noted time intervals.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. By maintaining communication statistics on the radio users of a shared radio communication system, channel access collisions can be minimized. In the preferred embodiment, by grouping the radios 1-9 in the system 100 into different subgroups based on their collected statistical information, channel access contentions are minimized. The radios 1-9 are preferably sub-grouped so that the chances of two randomly selected members of a particular subgroup accessing the system 100 at the same time are minimized based on the collected statistics.

The invention claimed is:

1. A method for accessing a radio communication system having a plurality of radios, comprising the steps of:
    (a) separating the plurality of radios into two or more groups, wherein each group of radios are arranged to communicate over different communication channels;
    (b) gathering a communication connection statistic on the plurality of radios;
    (c) determining whether the two or more groups should be reconfigured based on the gathered communication statistics; and
    (d) when a determination is made that the two or more groups should be reconfigured to allow a reduction in collisions on a communication channel, reconfiguring the grouping of radios based on the communication connection statistics gathered in step (b), wherein the communications connection statistics are used to determine the reconfigured radio groupings and wherein each of the reconfigured radio groupings are arranged to share different respective communication channels without removing radios from the system and without reducing the number of channels used amongst the groups.

2. A method as defined in claim 1, further comprising at step (d) the step of:
    allowing access to the radio communication system based on the reconfigured grouping of the radios.

3. A method as defined in claim 2, repeating steps (b) through (d) periodically.

4. A method as defined in claim 1, wherein the communication connection statistic gathered in step (b) comprises the average channel usage by each of the plurality of radios.

5. A method as defined in claim 1, wherein the communication connection statistic gathered in step (b) comprises the number of channel accesses per unit time by each of the plurality of radios.

6. A method as defined in claim 1, wherein the communication connection statistic gathered in step (b) comprises the priority of each of the plurality of radios.

7. A method as defined in claim 1, wherein the communication connection statistic gathered in step (b) comprises the average received signal strength of each of the plurality of radios.

8. A method as defined in claim 1, wherein the two or more groups of radios established in step (a) can access a given radio channel at specified times which are different for each of the two or more groups.

9. A method as defined in claim 1, wherein step (b) is performed by a radio communication system controller.

10. A method as defined in claim 1, wherein step (b) is performed by each of the plurality of radios.

11. A method as defined in claim 1, wherein the radio communication system comprises a time division multiple access radio communication system.

12. A method as defined in claim 1, wherein steps (b) and (c) are repeated periodically.

13. A method as defined in claim 1, wherein the communication connection statistic in step (b) is gathered by a central radio communication system resource.

14. A method as defined in claim 1, wherein the communication connection statistic in step (b) is gathered by each of the plurality of radios.

15. A method as defined in claim 1, wherein steps (b) and (c) are performed at predetermined periods of time.

16. A method as defined in claim 1, wherein the communication connection statistic gathered in step (b) comprises talk-time associated with each of the plurality of radios.

* * * * *